United States Patent [19]

Comroe et al.

[11] Patent Number: 5,179,721

[45] Date of Patent: Jan. 12, 1993

[54] METHOD FOR INTER OPERATION OF A CELLULAR COMMUNICATION SYSTEM AND A TRUNKING COMMUNICATION SYSTEM

[75] Inventors: Richard A. Comroe, Dundee; Gary W. Grube, Palatine, both of Ill.

[73] Assignee: Motorola Inc., Schaumburg, Ill.

[21] Appl. No.: 608,878

[22] Filed: Nov. 5, 1990

[51] Int. Cl.[5] .......................... H04Q 7/00; H04B 1/38; H04B 17/00

[52] U.S. Cl. .................... 455/33.1; 455/34.1; 455/67.1; 455/89; 455/56.1; 379/59

[58] Field of Search ...................... 455/32-34, 455/54, 56, 67, 70, 76, 89; 379/58-59, 63

[56] References Cited

U.S. PATENT DOCUMENTS

| | | | |
|---|---|---|---|
| 4,802,235 | 1/1989 | Treatch | 455/76 |
| 5,003,629 | 3/1991 | Ness-Cohn et al. | 379/59 |
| 5,020,093 | 5/1991 | Pireh | 379/59 |
| 5,058,199 | 10/1991 | Grube | 455/34 |

*Primary Examiner*—Curtis Kuntz
*Assistant Examiner*—Andrew Faile
*Attorney, Agent, or Firm*—Timothy W. Markison

[57] ABSTRACT

In a geographic region that contains a trunking communication system and a cellular communication system, where the coverage area of each system substantially overlaps, a method that enables a communication unit to operate in either system is disclosed. Normally in accordance with the present invention, a communication unit will monitor a control channel of the cellular communication system. When the communication unit is needed within the trunking communication system, a communication channel controller of the trunking communication system will place a telephone call to the communication unit via the cellular communication system. The telephone call indicates to the communication unit that it should transfer its affiliation from the cellular communication system to the trunking communication system. Once the communication unit has transferred its affiliation to the trunking communication system, it operates as a trunking communication unit.

10 Claims, 2 Drawing Sheets

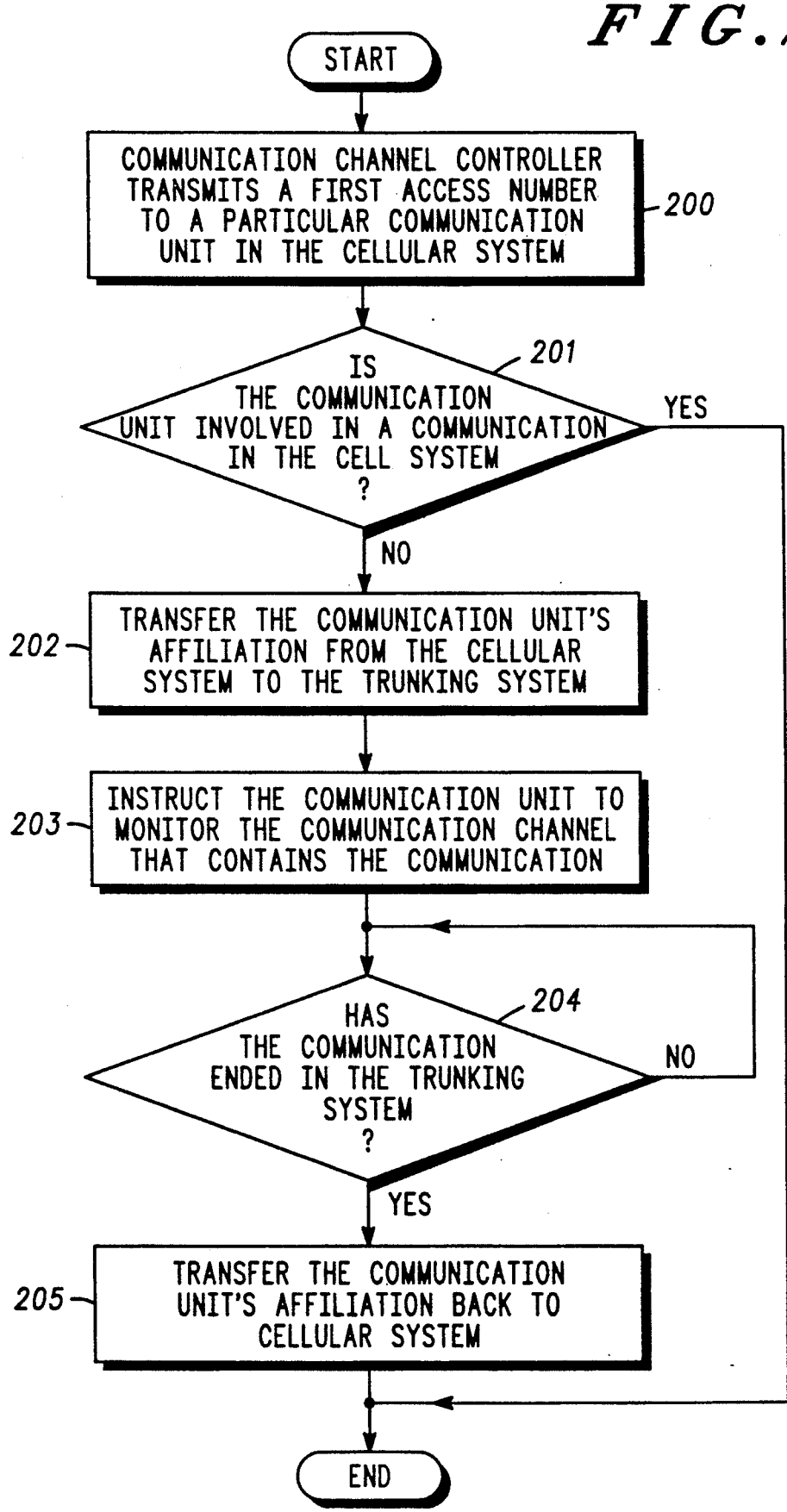

METHOD FOR INTER OPERATION OF A CELLULAR COMMUNICATION SYSTEM AND A TRUNKING COMMUNICATION SYSTEM

TECHNICAL FIELD

This invention relates generally to communication systems and in particular to a method that allows a trunking communication system to interoperate with a cellular communication system.

BACKGROUND OF THE INVENTION

The basic operation and structure of trunking communication systems and cellular telephone communication systems (cellular communication systems) are known. Trunking communication systems typically comprise a communication channel controller, a limited number of repeaters that transceive information via communication channels, and a plurality of communication units which may be mobile vehicle radios and/or portable radios. Of the communication channels, one is typically chosen to be a control channel. The control channel typically transceives operational information between the communication channel controller and the plurality of communication units such that, for example, the plurality of communication units can access the communication channels. Typically, the trunking communication system has a relatively large geographic coverage area, depending on the environment that the trunking communication system is located, the coverage area may be approximately 35 miles in diameter.

A cellular communication system typically comprises a mobile telephone switching office (MTSO), a plurality of cells, a limited number of communication channels, and a plurality of communication units which may be cellular telephones. Each of the plurality of cells comprises some of the of a limited number of communication channels, wherein one of the communication channels is designated as the control channel for that cell. The control channel transceives operational information between the plurality of communication units within the cell and the MTSO such that the communication units can place telephone calls via a phone system. Typically, the coverage area of each cell is relatively small in comparison with that of a typical trunking system. For example, a typical cell coverage area is approximately two miles in diameter. Because an individual cell coverage area is relatively small, the communication channels may be reused, at least once, within a geographic region of approximately the same size as a trunking communication system.

Due to the different configurations of a trunking communication system and a cellular communication system, a typical communication unit, without two receivers and two transmitters, cannot operate in both communication systems. (Having two receivers and transmitters adds considerable expense to manufacturing and purchasing of a communication unit, thus, for practical reasons, most communication units have only one receiver and one transmitter.) Recent advances in technology have expanded the bandpass of the receivers and transmitters in communication units such that a communication unit is able to transceive in either system. (Note that presently the FCC has designated for a trunking communication system, the frequency range of 806 to 821 Mhz as the transmit region and the frequency range of 850 to 865 Mhz as the receive region, and, for a cellular communication system, the frequency range of 824 through 849 Mhz as the transmit region and 869 to 894 Mhz for the receive region.) However, a communication unit with one receiver and one transmitter, is limited to operating in one system or the other due to technological limitations of the receiver and transmitter. Within the receiver, a mixer mixes a received signal with a local oscillator to produce an intermediate signal. The intermediate signal is passed through a bandpass filter which substantially filters out all other signals including those transmitted by the other communication system. The transmitter is limited for similar reasons.

Another limitation that impedes communication units from operating in both systems is that, in many cases, a trunking communication system and a cellular communication system within the same geographic area may be manufactured by different manufacturers. This presents a limitation in that typically one manufacturer does not know, or cannot use, the signalling protocol of the other, which makes accessing that system very difficult.

Therefore, a need exists for a method that will allow a communication unit having one receiver and one transmitter to operate in either a trunking communication system or a cellular communication system, wherein switching from one system to the other will be done transparent to a user of the communication unit and regardless of the manufacturers of the systems.

SUMMARY OF THE INVENTION

These needs and others are substantially met by the method for interoperation of a cellular communication system and a trunking communication system disclosed herein. In a geographic region that contains a trunking communication system and a cellular communication system, wherein the trunking communication system and the cellular communication system have substantially overlapping coverage areas, wherein the trunking communication system is operably coupled to the cellular communication system, a method for a communication unit to operate in either the trunking communication system or the cellular communication system is presented. The method comprises the steps of monitoring, by the communication unit, a control channel of the cellular communication system. When the communication unit detects its first access number on the control channel, the communication unit transfers its affilation from the cellular communication system to the trunking communication system when the communication unit is not an active participant in a communication in the cellular communication system. Once the communication unit has transferred its affiliation to the trunking communication system, it monitors the control channel of the trunking communication system and, when it detects its trunking identification number, it monitors a communication channel such that it may participate in a communication within the trunking communication.

In an aspect of the present invention, the communication unit, while monitoring a control channel in the cellular communication system, also monitors for a second or third access number. When the communication unit detects a second access number, it recognizes that this is a group call such that this particular communication unit along with several other communication units are instructed to transfer their affiliation from the cellular communication system to the trunking communication system. When the communication system detects a third access number, it receives a communication within the cellular telephone communication system.

BRIEF DESCRIPTION OF THE DRAWINGS

FIG. 2 illustrates a logic diagram that may be used to implement the present invention.

DETAILED DESCRIPTION OF A PREFERRED EMBODIMENT

Figure 1:
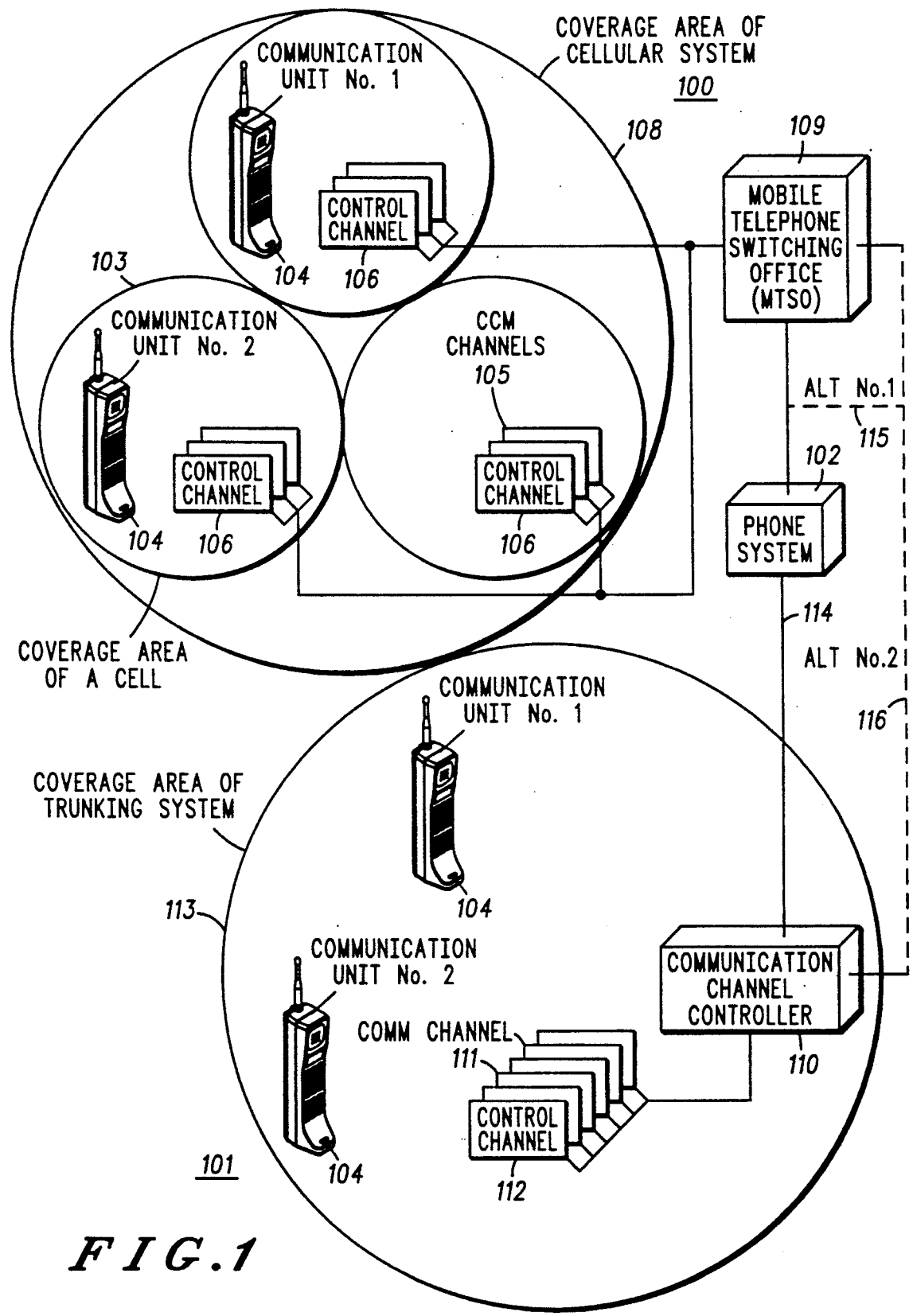
FIG. 1 illustrates a cellular communication system and a trunked communication system each having substantially the same coverage areas in accordance with the present invention.

FIG. 1 illustrates a trunking communication system (101) and a cellular communication system (100) operably coupled together in accordance with the present invention. The cellular communication system (100) comprises a mobile telephone switching office (MTSO) (109) and a plurality of cells (103) (3 shown), where each cell is operably coupled to the MTSO (109) and has a specific coverage area (107). Each cell comprises a limited number of communication channels (105), which may be carrier frequencies, frequency pairs, and/or time division multiplexing (TDM) slots, wherein one of the communication channels is designated a control channel (106). The summation of the coverage areas of each cell (107) comprises the coverage area of the cellular communication system (108). The cellular communication system also comprises a plurality of communication units (2 shown), where the communication units are equipped with one receiver and transmitter that has adequate bandwidth to operate in both the trunking communication system and the cellular communication system.

The trunking communication system (101) comprises a communication channel controller (110), a plurality of communication channels (111), wherein one of the communication channels is designated a control channel (112), and the plurality of communication units (104). The coverage area of the trunking communication system (113) substantially overlaps, and may be approximately equal to, the coverage area of the cellular communication system (108), however, for illustrative purposes the coverage areas are shown separately.

The trunking communication system (101) is operably coupled to the cellular communication system by one of three methods. The first and most convenient method, especially when the communication systems are manufactured by different manufacturers, is to couple the systems together through a phone line (114) or a plurality of phone lines, to a phone system (102). This coupling method allows the trunking communication system to transfer messages to the cellular communication system by placing telephone calls to the cellular communication system via the telephone system (102). An alternative method, is to directly connect the communication channel controller (110) to the MTSO (109) by a direct connection (116). Finally, if the communication systems are manufactured by the same manufacturer, or an agreement exists between manufacturers, the communication channel controller (110) may be coupled directly into the communication channel links (117) of the cellular communication system by a coupling link (115) that is similar to a telephone link.

Generally, in accordance with this invention, communication units monitor control channels of the cellular communication system and are operating as cellular telephones. When a particular communication unit is needed for a communication within the trunking communication system, the communication channel controller (110) places a telephone call to the particular communication unit via the cellular communication system. The telephone number that the communication channel controller (110) dials is an individual telephone number, or a first access number, for the particular communication unit. Once the particular communication unit receives the telephone call page, it does not answer the phone as in ordinary phone usage, but detects the first access number to indicate that it is to transfer its affiliation from the cellular communication system to the trunking communication system. (A telephone call page may be equated with the ringing of a telephone.) Once the communication unit has transferred its affiliation to the trunking communication system it operates as a trunking radio. When the communication within the trunking communication system is completed, the particular communication unit transfers its affiliation back to the cellular communication system.

FIG. 2 illustrates a logic diagram of the present invention. At step (200), the communication channel controller (110), when it determines that a particular communication unit is needed for a communication within the trunking communication system, transmits a first access number, or places a telephone call, to the particular communication unit via the cellular communication system. The communication channel controller (110), stores in a database, the trunking identification number of each of the communication units, and in accordance with this invention, would also store a first access number for each communication unit as well. The communication channel controller (110) may also store in the database a second access number, or second telephone number which would represent a group call such that several communication units would transfer their affiliation to the trunking communication system relatively simultaneously and requiring the communication channel controller (110) to place only one telephone call. If the particular communication unit does not detect its first access number, either do to the communication unit being off or out of range, the communication channel controller (110) retransmits the first access number from anywhere from five times to twenty times, if the communication unit responds, the process continues, otherwise it ends. The process may also end if the communication unit is involved in a communication within the cellular communication system (201).

If the communication unit is not involved in a communication within the cellular communication system (201), the communication unit's affiliation is transferred from the cellular communication system to the trunking communication system (202). Transferring a communication unit's affiliation primarily consists of changing the local oscillator frequency of the receiver and the transmitter such that the communication unit is either operable in the cellular band or the trunking band. Once the particular communication unit is affiliated with the trunking communication system (202), the communication channel controller (110) instructs the communication unit to monitor a particular communication channel that contains the communication of interest (203). The communication unit will remain affiliated with the trunking communication system as long as the communication remains active (204). Once the communication has ended, which may be immediately after the communication channel is deassigned, or after a predetermined period of time has elapsed after deassigning the communication channel, for example 1 to 20 seconds, the communication unit transfers its affiliation back to the cellular communication system (205). Once the communication unit is affiliated with the cellular communication system, the process can repeat again for this particular communication unit. Note that while this process is being engaged for one particular communication unit, multiple communication units could also be involved in a similar process such as when the communication channel controller utilizes the second access number. The process may also be done for multiple communication units on an individual basis. In addition, the present invention does not substantially interfere with independent operations of the trunking communication system or of the cellular communication system.

When a user of a communication unit desires to place a telephone call, the user simply dials the desired number as he would with any cellular telephone. When the user does this, the cellular system processes this call as it would any other. When the user desires to place a call in the trunking communication system, he activates a push-to-talk button, or similar process that generates an inbound signalling word (ISW). When the communication unit detects an activation of the push-to-talk button, it transfers its affilation to the trunking communication system such that the call can be placed.

What is claimed is:

1. In a geographic region that contains at least one trunking communication system and at least one cellular communication system, wherein the trunking communication system and the cellular communication system have substantially overlapping coverage areas, wherein the at least one trunking communication system is operably coupled to the at least one cellular communication system, a method for a communication unit of a plurality of communication units to operate in either the at least one trunking communication system or the at least one cellular communication system, the method comprises the steps of:
   a) monitoring at least one control channel of the at least one cellular communication system;
   b) transferring affiliation from the at least one cellular communication system to the at least one trunking communication system when a first access number of the communication unit is detected on the at least one control channel of the at least one cellular communication system;
   c) monitoring at least one control channel of the at least one trunking communication system; and
   d) receiving a communication via the at least one trunking communication system when the communication unit detects its trunking identification number on the at least one control channel of the trunking communication system.

2. The method of claim 1 further comprises the step of transferring affiliation form the at least one trunking communication system to the at least one cellular communication system when the communication within the at least one trunking communication system is completed.

3. The method of claim 2 further comprises the steps of:
   e) transmitting, via the at least one control channel of the at least one cellular communication system, a request for a communication channel in the cellular communication system; and f) monitoring the at least one control channel of the cellular communication system for a communication channel access signal.

4. The method of claim 2 further comprises the steps of:
   e) monitoring the at least one control channel of the at least one cellular communication system for a third access number;
   f) receiving, within the at least one cellular communication system, a communication when the third access number is detected.

5. The method of claim 1 further comprises the steps of:
   e) monitoring the at least one control channel of the at least one cellular communication system for a second access number;
   f) transferring affiliation from the at least one cellular communication system to the at least one trunking communication system when the second access number is detected, wherein the second access number indicates that a group of communication units is to transfer affiliation from the at least one cellular communication system to the at least one trunking communication system.

6. In a geographic region that contains at least one trunking communication system and at least one cellular communication system, wherein the at least one trunking communication system and the at least one cellular communication system have substantially overlapping coverage areas and wherein at least some of a plurality of communication units primarily monitor a control channel of the at least one cellular communication system, a method that enables the at least some of the plurality of communication units to communicate in either the at least one trunking communication system or the at least one cellular communication system, the method comprises the steps of:
   a) determining, by a communication channel controller of the at least one trunking communication system, that at least one of the at least some of the plurality of communication units is to participate in a communication within the at least one trunking communication system;
   b) transmitting, by the communication channel controller of the at least one trunking communication system, an information packet to a communication channel controller of the at least one cellular communication system, wherein the information packet comprises a request that the at least one of the at least some of the plurality of communication units is requested to affiliate with the at least one trunking communication system; and
   c) transmitting, by the communication channel controller of the at least one cellular communication system, the information packet to the at least one of the at least some of the plurality of communication units.

7. The method of claim 6 further comprises the step of affiliating the at least one of the at least some of the plurality of communication units to the at least one trunking communication system when the at least one of the at least some of the plurality of communication units receives the information packet and is not actively engaged in a communication within the at least one cellular communication system.

8. The method of claim 7 further comprises the step of reaffiliating the at least one of the at least some of the plurality of communication units to the at least one cellular communication system when the communication within the at least one trunking communication system ends.

9. In a geographic region that contains at least one trunking communication system and at least one cellular communication system, wherein the at least one trunking communication system and the at least one cellular communication system have substantially overlapping coverage areas and wherein at least some of a plurality of communication units primarily monitor a control channel of the at least one cellular communication system, a method for a communication channel controller of the at least one trunking communication system to enable the at least some of the plurality of communication units to operate in either the at least one trunking communication system or the at least one cellular communication system, the method comprises the steps of:

a) determining that a particular communication unit of the at least some of the plurality of communication units is to be part of a communication within the at least one trunking communication system;

b) transmitting a first access number to the at least one cellular communication system, wherein the first access number indicates that the particular communication unit is to transfer affiliation from the at least one cellular communication system to the at least one trunking communication system; and c) coupling the particular communication unit to the communication when the particular communication unit is affiliated with the at least one trunking communication system.

10. The method of claim 9 further comprises the steps of:

d) determining that a particular group of communication units of the at least some of the plurality of communication units is to be part of a communication within the at least one trunking communication system; and e) transmitting a second access number to the at least one cellular communication system, wherein the second access number indicates that the particular group of communication units is to transfer affiliation from the at least one cellular communication system to the at least one trunking communication system.

* * * * *